May 15, 1951 C. S. METSGER 2,553,201
ENGINE STARTER AND THE LIKE
Filed May 29, 1946
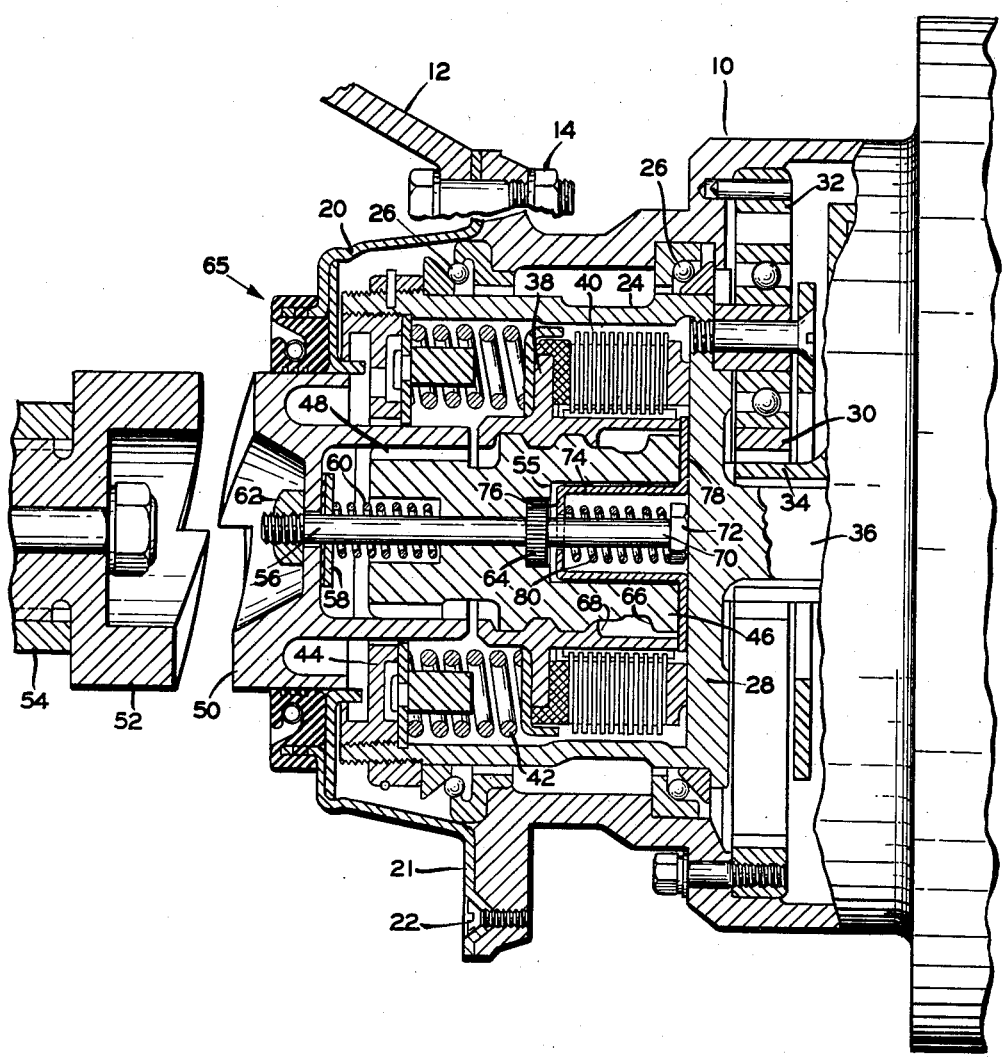
INVENTOR
CHARLES S. METSGER
BY
F. H. Miller
ATTORNEY Patented May 15, 1951

2,553,201

UNITED STATES PATENT OFFICE 2,553,201

ENGINE STARTER AND THE LIKE

Charles S. Metsger, Lodi, N. J., assignor to Bendix Aviation Corporation, Teterboro, N. J., a corporation of Delaware Application May 29, 1946, Serial No. 673,069

2 Claims. (Cl. 74—7)

1

This invention relates to engine starters and the like, and particularly to an improvement concerning the positioning of a driving clutch member.

A usual direct cranking starter comprises a rotatively driven axially stationary spline nut, and a screw shaft in the nut splined to a starter clutch member. The clutch member is frictionally held so that, when the nut rotates, it first moves the screw shaft axially from an initial position, which similarly moves the clutch member through the intermediary of a spring to engage a cooperating engine clutch member. After such engagement, continued rotation of the nut rotates the clutch member to start the engine. After such starting, when the starter motor is deenergized, the engine clutch element cams the starter clutch member back to its initial position, in a usual manner. Ordinarily the means, for frictionally holding the clutch member in the aforesaid initial position, operates satisfactorily, but there are conditions under which the jaw may work out of its initial position into undesirable engagement with the engine clutch element. One such condition is that wherein the axis of the clutch member normally slopes downwardly toward the engine, or where it does so as during maneuvers of a vehicle by which the starter is carried. Another such condition is that existing under vibration, and a third condition including both the aforementioned slope and vibration.

Other conditions, such as wear of, or oil on, the friction means, and temperature changes, may contribute to movement of the clutch member as aforesaid.

An object of the invention is to prevent the above-mentioned undesirable engagement of the starter clutch jaw member to the engine clutch element, and to do so by novel and effective means.

Another object is to render such means effective at all times irrespective of all of the conditions stated.

Another object of the invention is to provide means for assisting the above-mentioned usual camming action of the starter clutch member by the engine clutch element.

Another object is to render the means of the above objects simple and durable in construction, and economical to manufacture.

These and other objects and features of the invention are pointed out in the following description in terms of the embodiment thereof which is shown in the accompanying drawing.

2

It is to be understood, however, that the drawing is for the purpose of illustration only, and is not designed as a definition of the limits of the invention, reference being had to the appended claims for this purpose.

In the drawing the single figure is a view partially in side elevation and partially in section of a portion of a direct cranking starter embodying the invention.

Referring to the drawing, which shows only sufficient of the starter for an understanding of the invention, the structure comprises, in general, an inner casing portion 10 secured to an engine crank case 12, as by bolts 14. An end member 20 has a flange 21 secured to the portion 10, as by screws or bolts 22, and held by the bolts 14 between the portion 10 and the crank case 12.

A barrel 24, rotatably journaled in bearings 26, has an end wall 28 supporting planet gears 30 operating between an orbital gear 32, fixed to the casing portion 10, and a sun gear 34, which is driven in a usual manner, by a motor, through further speed reducing means, and is journaled on a trunnion portion 36 of the end wall 28 of the barrel 24.

A spline nut 38 is connected to the barrel 24 therein by a disc pack clutch 40 having interlayered discs fixed to the nut 38 and the barrel 24, respectively, and axially biased together by springs 42 held in adjusted relation to each other, as by a ring 44 screw threaded in the opposite end of the barrel 24.

A screw shaft 46, having wide pitch screw thread connection to the spline nut 38 therein, has an axially slidable spline connection 48 to a starter clutch jaw member 50, which is adapted to engage an engine clutch jaw element 52 on an engine shaft 54. The shaft 46, in this instance, has a relatively deep recess 55 opening from the end of the shaft opposite to the end of the shaft to which the clutch member 50 is spline connected, for a purpose which will further appear.

The member 50 and the shaft 46 are connected, in this instance, by a mesh rod 56 extending through an aperture in the member 50, which aperture is closed by a seal 58 biased against the member 50 by a spring 60 extending into a recess in the screw shaft 46.

The member 50 is maintained axially in position by a nut 62, locked to the mesh rod, and by an enlargement 64 fixed to the rod and press fitted into a recess at the bottom of the recess 55.

The screw shaft is limited in its right hand axial movement, as viewed in Figure 1, by the barrel end wall 28 and, in its left hand movement, by engagement of a shoulder 66 on the shaft with a shoulder 68 on the spline nut 38.

A unit 65, of which the end member 20 in this instance constitutes a part, surrounds the clutch member 50, and operates as friction holding means therefor, and as means for sealing the starter against the admission of oil from the crank case 12 between the unit 65 and the member 50.

The mesh rod 56 has a rear extension 70 screw threaded to receive a nut 72. A member 74 of substantially cup shape has a bottom wall 76, next to the bottom of the recess 55, provided with an opening by which the cup surrounds and is slidable on the extension 70. A portion or flange 78 at the mouth end of the cup 74 extends laterally outwardly of the cup, between the screw shaft 46, and the barrel end wall 28, to position for axial engagement with the spline nut 38.

A compression spring 80 surrounds the extension 70 between the nut 72 and the bottom wall 76 of the cup 74 and, in the positions of the parts illustrated, operates, through the mesh rod 56 and the nut 62, to augment the unit 65 in maintaining the clutch member 50 in its retracted position, as illustrated, at all times, when the latter is not operating to start the engine.

In operation, when the sun gear 34 is rotatably driven, it turns the planet gears 30, which, since they are carried by the barrel 24 and are in mesh with the fixed orbital gear 32, react to turn the barrel 24, which turns the spline nut 38, through the intermediary of the disc clutch 40.

With the screw shaft 46 splined by the connection 48 to the clutch member 50, and the latter engaged by the unit 65, the spline nut 38 first causes the screw shaft 46 to advance to the left from the position shown, and against the action of the spring 80, to move the member 50, through the intermediary of the spring 60, to position engaging the engine clutch element 52. At the latter position, the shoulder 66 on the shaft 46 engages the shoulder 68 on the spline nut 38, so that, in continued turning of the nut, the shaft is locked to the nut to turn the member 50 for normally starting the engine.

When the engine starts, the clutch element 52 thereof overrides the starter jaw member 50 against the action of the spring 60, and when the starter motor is deenergized, the element 52 cams the member 50 generally in a usual manner back to the position indicated, but which camming action is augmented by the present invention through the assistance of the spring 80. If the engine shaft, for any reason, abnormally resists turning, or if the engine backfires, the reaction is absorbed in the starter by the disc clutch 40.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. In a device including a clutch member adapted for axial movement in one direction to engage a cooperating clutch element and rotative movement to rotate the element, spring means, an axially stationary rotative spline nut, and means for frictionally holding the clutch member for the axial movement thereof, the combination of a screw shaft adapted for spline connection at one end to the clutch member and having a recess open to its other end and adapted for axial movement by the spline nut to effect the axial movement of the clutch member through the spring means and for rotative movement by the spline nut to effect the rotatable movement of the clutch member through the spline connection, means providing for axial relative movement between the clutch member and said shaft and preventing separation of the member from the shaft and including a meshing rod for the clutch member having a portion in said recess and having a screw threaded end, a nut on said rod end, a cup-like member having a bottom end opening next to the bottom of said recess by which the cup surrounds and is slidable on said rod, said cup having a mouth end portion extending laterally outwardly of the cup to position for axial engagement with said spline nut, and compression spring means surrounding said rod and acting between said second nut and the bottom of said cup.

2. In a device including a clutch member adapted for axial movement in one direction to engage a cooperating clutch element ond rotatable movement to rotate the element, an axially stationary rotatable spline nut, spring means, a screw shaft having spline connection at one end to the clutch member and an axial recess at the other end and adapted for axial movement in the nut to effect the axial movement of the clutch member through the spring means and for rotative movement by the nut to effect said rotative movement of the clutch member through the spline connection, means providing for axial relative movement between the clutch member and the shaft and preventing separation of the member from the shaft, and means for frictionally holding the clutch member for the axial movement thereof, the combination of means adapted to cooperate between the spline nut and the clutch member including a supporting member extending into said recess and having a flange portion extending outward from said recess and adapted to be held against axial movement, and spring means coacting with said supporting member and said clutch member to bias said clutch member towards a retracted position.

CHARLES S. METSGER.

REFERENCES CITED

The following references are of record in the file of this patent:

UNITED STATES PATENTS

| Number | Name | Date |
|---|---|---|
| 1,926,913 | Nardone | Sept. 12, 1933 |
| 1,927,714 | Nardone | Sept. 19, 1933 |
| 1,996,733 | Allen | Apr. 2, 1935 |
| 2,296,975 | Berges | Sept. 29, 1942 |
| 2,331,077 | Nardone | Oct. 5, 1943 |
| 2,412,829 | Nardone | Dec. 17, 1946 |